Oct. 24, 1967  A. A. LACHANCE  3,348,326
HANDLE CONSTRUCTION
Filed Oct. 5, 1965
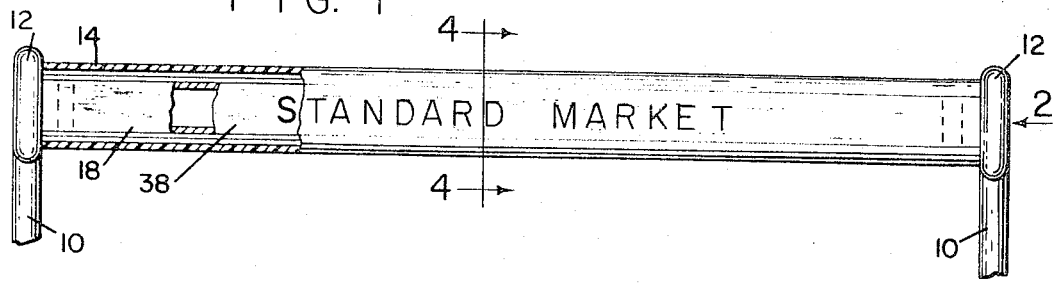
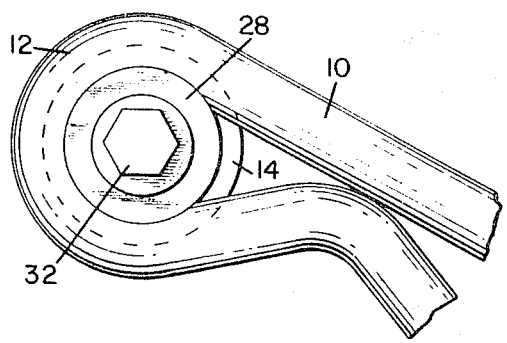
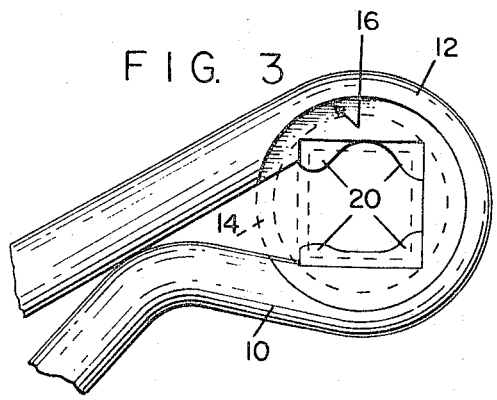
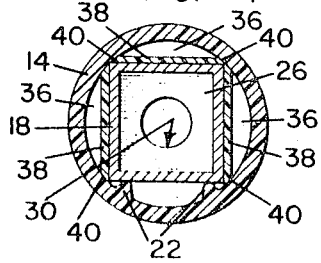
INVENTOR
ARMAND A. LACHANCE
BY *Charles R. Fay*
ATTORNEY United States Patent Office 3,348,326
Patented Oct. 24, 1967

3,348,326
HANDLE CONSTRUCTION
Armand A. Lachance, % American Metal Products Co., Auburn, Mass. 01501
Filed Oct. 5, 1965, Ser. No. 493,128
1 Claim. (Cl. 40—308)

ABSTRACT OF THE DISCLOSURE

A handle construction particularly adapted for a pusher handle for a cart which includes a pair of tubes one within the other, the inner tube being substantially square or rectangular in cross section, and the other tube being cylindrical and transparent and having inwardly directed ribs or the like for contacting one face only of the inner square or rectangular tube which is slid inwardly with respect thereto and is held by said ribs in a fixed position, so that advertising material or the like may be interposed and held by the corners of the inner tube against the outer tube. Thus the interposed material is clearly visible at the three sides of the inner tube that do not have ribs associated therewith.

This invention relates to a new and improved handle particularly adapted for carts of the type used in stores, and the principal object of the invention resides in the provision of a strong and rigid handle employing a clear tube or the like as an outside member, the same being held between two end brackets connected to the cart for pushing the cart, the invention residing in the means of connecting the tube to the end brackets and also to the provision of an interior tubular member of non-circular construction which is held in fixed relation in said clear tube and which provides flats at the sides thereof for the support of plastic or similar material strips which can be provided with identification, information, etc. and which can be viewed through the clear tube.

Other objects and advantages of the invention will appear hereinafter.

Reference is to be had to the accompanying drawings in which:

FIG. 1 is a view in elevation with parts cut away and in section illustrating the construction of the new handle;

FIG. 2 is a view in end elevation thereof of an enlarged scale and looking in the direction of arrow 2 in FIG. 1;

FIG. 3 is a reverse view of the construction of FIG. 2 with the two tubular members shown in dotted lines, and FIG. 4 is a section on line 4—4 of FIG. 1 on an enlarged scale.

The cart or basket to which the handle is to be attached is not here shown but a pair of wire end members or brackets 10, 10 are connected in any way desired thereto. These wire end members are each provided with a loop 12, 12 between which the clear tube 14 is held. This tube is preferably cylindrical and while it may be tinted or even opaque, it is preferred that it should be transparent or at least translucent, and is conveniently made of plastic.

At the interior aspects or facing sides of the loops 12, 12, the same are formed with an indentation in circular form as at 16, these indentations closely receiving the ends of the tube 14.

Within the tube 14 there is a non-circular or square or rectangular tube 18. This tube may be made of metal or other suitable material as may be desired. It extends the length of the tube 14 and as seen in FIG. 4 is held against rotation by square or rectangular indentations 20, 20, in loops 12, see FIG. 3. Thus the loops 12 hold the tube 18 against rotation and they hold the tube 14, and when clamping means to be described is applied thereto, the parts are held in assembled relation.

One feature of the invention is that the tube 14 is made with a pair of inwardly extending projections 22, 22 which bear against one of the flats of the tube 18, see particularly FIG. 4. The corners of the tube 18 also closely approach or bear on the interior diameter of tube 14 as shown in FIG. 4 and by this means tube 14 is held against rotation relative to the tube 18.

The tube 18 is also provided with end plates at 26 and as shown in FIG. 2 a disc or the like 28 may be used to close the ends of the loops overlying and concealing the ends of the tube 18. The plates at 28 can then be held by nuts, rivets or the like to plate 26, plates 26 being fixed adjacent the ends of the tube 18. Thus looking at FIG. 4 the aperture at 30 represents a threaded opening for a bolt, the head of which is indicated at 32 in FIG. 2, or a blind rivet could also be used.

The projections 22 may actually be ribs extending longitudinally of the tube 14 from end to end thereof. It is not necessary that they be continuous but this is the easiest way to make them as the tubing can be extruded.

This construction leaves a series of empty pockets indicated in FIG. 4 at 36, 36, the pockets being formed by a flat of tube 18 and a section of tube 14. The pockets can be provided with slide-in strips 38, 38. Preferably these strips have beveled edges 40, 40 to conform to the interior diameter of tube 14 but this is not necessary.

The strips 38 are thus seen to be held in position. They cannot rotate relative to either tube 14 or 18 and their position is thus determined by the position of the indentations 20, 20 in FIG. 3. The strips bear appropriate information or advertising, etc. and are held in the positions desired but on the other hand can be slid out and changed by removing an end disc 28 giving access to the interior of tube 14.

Having thus described my invention and the advantages thereof, I do not wish to be limited to the details herein disclosed, otherwise than as set forth in the claim, but what I claim is:

A pusher handle construction for a cart comprising a pair of tubes, one within the other, said tubes being of different cross sectional conformation and the inner tube being provided with at least one flat surface thereon for the slide-in reception of an elongated imprinted strip which is visible through the outer tube, means for preventing rotation of the inner tube with respect to the outer tube, and means at the ends of said combined tubes for supporting the same on a cart, wherein the inner tube is substantially rectangular and the outer tube is substantially cylindrical and transparent, the corners of the inner tube substantially impinging upon the interior surface of the outer tube, and an inwardly directed projection on the interior surface of the outer tube substantially impinging upon one of the flat surfaces of the inner tube and maintaining the same against rotation within the outer tube, the other sides of the inner tube being unimpeded and providing for a clear view of the strip through the outer tube.

References Cited
UNITED STATES PATENTS 3,270,454 9/1966 Lachance _____ 40—308
3,218,978 11/1966 Drugan et al. _____ 40—308

EUGENE R. CAPOZIO, Primary Examiner.

W. GREIB, Assistant Examiner.